(12) United States Patent
Kraeuter

(10) Patent No.: US 11,852,201 B2
(45) Date of Patent: Dec. 26, 2023

(54) DOUBLE CLUTCH TRANSMISSION FOR AN ELECTRIC VEHICLE, AND DRIVE UNIT FOR AN ELECTRIC VEHICLE

(71) Applicant: Robert Bosch GmbH, Stuttgart (DE)

(72) Inventor: Janek Kraeuter, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 285 days.

(21) Appl. No.: 17/430,361

(22) PCT Filed: Feb. 5, 2020

(86) PCT No.: PCT/EP2020/052872
§ 371 (c)(1),
(2) Date: Aug. 12, 2021

(87) PCT Pub. No.: WO2020/164996
PCT Pub. Date: Aug. 20, 2020

(65) Prior Publication Data
US 2022/0128099 A1     Apr. 28, 2022

(30) Foreign Application Priority Data

Feb. 14, 2019   (DE) ............... 10 2019 201 980.3

(51) Int. Cl.
*F16D 21/00* (2006.01)
*F16D 21/06* (2006.01)
(Continued)

(52) U.S. Cl.
CPC ............ *F16D 21/06* (2013.01); *B60K 1/00* (2013.01); *B60K 17/02* (2013.01); *F16D 13/70* (2013.01);
(Continued)

(58) Field of Classification Search
CPC ............ F16H 3/006; F16H 2200/0021; F16H 2200/0034; F16D 13/70; F16D 21/06; B60K 1/00; B60K 17/02; B60K 17/08
See application file for complete search history.

(56) References Cited

U.S. PATENT DOCUMENTS

| | | |
|---|---|---|
| 2013/0306424 A1 | 11/2013 | Kaminaga |
| 2016/0053826 A1 | 2/2016 | Azumai et al. |
| 2019/0048943 A1* | 2/2019 | Park ............. F16D 25/12 |

FOREIGN PATENT DOCUMENTS

| | | |
|---|---|---|
| CN | 101389879 A | 3/2009 |
| CN | 104024672 A | 9/2014 |

(Continued)

OTHER PUBLICATIONS

Shen et al., "A dual clutch device installed on the auxiliary engine of a road sweeper," Commercial Vehicle, 2012, vol. 14, pp. 72-73 (3 pages including statement of relevance).

(Continued)

*Primary Examiner* — William C Joyce
(74) *Attorney, Agent, or Firm* — Michael Best & Friedrich LLP

(57) ABSTRACT

A double clutch transmission (10) for an electric vehicle including an input shaft (40) coupled to a first output shaft (41) and coupled to a second output shaft (42) configured as a hollow shaft, a first component clutch (11), and a second component clutch (12). The second output shaft (42) includes a flange section (65) extending in the radial direction (r). The first component clutch (11) can be actuated by a first actuating unit (51) including a driver engaging through the flange section (65) in the axial direction (x) and is connected fixedly to the second output shaft (42) so as to rotate with it. The driver can be actuated in the axial direction (x) via a first release bearing, and the first com- (Continued)

ponent clutch (11) can be actuated in the axial direction (x) by the driver via a second release bearing.

8 Claims, 3 Drawing Sheets

(51) Int. Cl.
    *B60K 1/00*           (2006.01)
    *B60K 17/02*         (2006.01)
    *F16D 13/70*        (2006.01)
    B60K 17/08         (2006.01)
    F16H 3/00          (2006.01)

(52) U.S. Cl.
    CPC .............. *B60K 17/08* (2013.01); *F16H 3/006* (2013.01); *F16H 2200/0021* (2013.01); *F16H 2200/0034* (2013.01)

(56) References Cited

FOREIGN PATENT DOCUMENTS

| | | | |
|---|---|---|---|
| CN | 104235231 | A | 12/2014 |
| CN | 106195052 | A | 12/2016 |
| CN | 108343714 | * | 2/2018 |
| CN | 105465215 | B | 4/2018 |
| DE | 10115453 | A1 | 10/2002 |
| DE | 10328193 | A1 | 1/2005 |
| DE | 102007007468 | A1 | 6/2008 |
| DE | 102007027117 | A1 | 12/2008 |
| DE | 102008012894 | A1 | 9/2009 |
| DE | 102011102329 | A1 | 12/2011 |
| DE | 102010048836 | A1 | 4/2012 |
| DE | 102014220909 | A1 | 4/2016 |
| DE | 102016216322 | A1 | 3/2017 |
| DE | 102017102733 | A1 | 9/2017 |
| DE | 102016124812 | A1 | 6/2018 |
| DE | 102017203542 | A1 | 9/2018 |
| DE | 102018116589 | A1 | 1/2019 |
| EP | 1818557 | A1 | 8/2007 |
| JP | 2009144890 | A | 7/2009 |
| JP | 2010156404 | A | 7/2010 |
| WO | 2017008807 | A1 | 1/2017 |
| WO | 2018024966 | A1 | 2/2018 |

OTHER PUBLICATIONS

Cui et al., "Design of Release Bearing Assembly of DCT Hydraulic Actuator," Hebei Agricultural Machinery, 2011, vol. 3, pp. 62-64 (4 pages including statement of relevance).
Translation of International Search Report for Application No. PCT/EP2020/052872 dated Jun. 29, 2020 (2 pages).

* cited by examiner

DOUBLE CLUTCH TRANSMISSION FOR AN ELECTRIC VEHICLE, AND DRIVE UNIT FOR AN ELECTRIC VEHICLE

The invention relates to a double clutch transmission for an electric vehicle, which double clutch transmission comprises an input shaft, a first component clutch, by means of which the input shaft can be coupled to a first driven shaft, and a second component clutch, by means of which the input shaft can be coupled to a second driven shaft. The invention also relates to a drive unit for an electric vehicle, which drive unit comprises a double clutch transmission according to the invention.

Double clutch transmissions for motor vehicles comprise two component transmissions, a fully automatic gear change without traction power interruption being possible. Here, each of the component transmissions is assigned in each case one component clutch, by means of which a driven shaft of the respective component transmission can be coupled to an input shaft. The driven shafts of the component transmissions are connected via further transmission stages to a common output shaft. In this way, different rotational speed transmission ratios between the input shaft and the output shaft can be selected.

Document DE 102017203542 A1 discloses a transmission for a motor vehicle. The transmission has a first clutch and a second clutch which can be coupled independently of one another to a clutch carrier. The first clutch comprises a first actuating unit with a first release bearing. The second clutch comprises a second actuating unit with a second release bearing.

Document DE 102016124812 A1 discloses a friction clutch device for a motor vehicle, which friction clutch device is configured as a double clutch. The double clutch comprises an actuating device which has a first release bearing and a second release bearing. Here, the first release bearing is assigned to a first component clutch, and the second release bearing is assigned to a second component clutch.

Document DE 102017102733 A1 discloses a double clutch for a motor vehicle, which double clutch comprises a first component clutch and a second component clutch. A lever element is provided in order to actuate the clutch. A pressing plate is moved axially via a tie rod by way of a pivoting movement of the lever element.

Document DE 102011102329 A1 discloses a double clutch for a motor vehicle, which double clutch comprises two friction clutches. One of the two friction clutches is assigned a lever spring. Here, the lever spring loads a tie rod which thereupon displaces a pressing plate axially.

SUMMARY OF THE INVENTION

A double clutch transmission for an electric vehicle is proposed. The double clutch transmission comprises an input shaft which can be driven by an electric motor, a first driven shaft and a second driven shaft. The double clutch transmission comprises, furthermore, a first component clutch, by means of which the input shaft can be coupled to the first driven shaft, and a second component clutch, by means of which the input shaft can be coupled to the second driven shaft.

Here, the second driven shaft is configured as a hollow shaft. Here, the second driven shaft preferably surrounds the first driven shaft coaxially. The first driven shaft and the second driven shaft rotate about a rotational axis. A direction parallel to the rotational axis is called an axial direction in the following text. A direction at a right angle with respect to the rotational axis is called a radial direction in the following text.

According to the invention, the second driven shaft has a flange section which extends in the radial direction. The second component clutch is attached in a radially outer region of the flange section of the second driven shaft. If a pressing force acts in the axial direction, for example via a pressure plate, on the second component clutch and the first component clutch opens at the same time, the second component clutch closes and the input shaft is coupled to the second driven shaft.

According to the invention, the first component clutch can be actuated by a first actuating unit which has a driver. The driver of the first actuating unit reaches through the flange section of the second driven shaft in the axial direction. Here, the driver of the first actuating unit is connected fixedly to the second driven shaft for conjoint rotation.

According to the invention, furthermore, the first actuating unit has a first release bearing and a second release bearing. The driver of the first actuating unit can be actuated in the axial direction via the first release bearing, and the first component clutch can be actuated in the axial direction by the driver via the second release bearing, for example via a pressure plate.

If a pressing force acts in the axial direction on the first release bearing, the pressing force is transmitted from the first release bearing via the driver to the second release bearing. The second release bearing transmits the pressing force, for example via a pressure plate, to the first component clutch which closes thereupon. As a result, the input shaft is coupled to the first driven shaft. Here, the pressing force is transmitted in the axial direction through the flange section of the second driven shaft.

Here, the driver of the first actuating unit can preferably be displaced in the axial direction relative to the flange section of the second driven shaft. If a pressing force therefore acts in the axial direction on the first release bearing, the pressing force is transmitted from the first release bearing via the driver which thereupon moves in the axial direction and in the process transmits the pressing force to the second release bearing.

In accordance with one preferred refinement of the invention, the component clutches of the double clutch transmission are arranged in such a way that the second component clutch surrounds the first component clutch coaxially. As a result, an amount of installation space which is required for the component clutches is advantageously decreased.

In accordance with one advantageous refinement of the invention, the first component clutch is configured as a multiple disk clutch, and/or the second component clutch is configured as a multiple disk clutch. The component clutches preferably have multiple disk assemblies which can be actuated by way of a pressing force which acts in the axial direction.

The first actuating unit preferably has a first pressure plate for actuating the first component clutch. Here, the first pressure plate can be actuated by the second release bearing. The second actuating unit preferably has a second pressure plate for actuating the second component clutch.

In accordance with one advantageous refinement of the invention, the first pressure plate of the first actuating unit is connected fixedly to the first driven shaft for conjoint rotation. Here, the first pressure plate can preferably be displaced in the axial direction relative to the first driven shaft.

In accordance with another advantageous refinement of the invention, the first pressure plate of the first actuating unit is mounted such that it can be rotated relative to the first driven shaft. Here, the first pressure plate can preferably be displaced in the axial direction relative to the first driven shaft.

The first driven shaft is preferably connected fixedly to a first pinion for conjoint rotation. Here, the first pinion meshes with a first gearwheel. The second driven shaft is preferably also connected fixedly to a second pinion for conjoint rotation. The second pinion meshes with a second gearwheel. Here, the first pinion and the first gearwheel form a first gear stage. The second pinion and the second gearwheel form a second gear stage.

The first gearwheel and the second gearwheel are preferably connected fixedly to a common output shaft for conjoint rotation. Here, the output shaft can also be connected fixedly to a third pinion for conjoint rotation. The third pinion meshes, for example, with a third gearwheel which serves to drive a differential gear mechanism.

A drive unit for an electric vehicle is also proposed. Here, the drive unit comprises a double clutch transmission according to the invention and an electric motor for driving the input shaft of the double clutch transmission according to the invention. The drive unit according to the invention advantageously also comprises a differential gear mechanism, by means of which two drive wheels of the electric vehicle can be driven.

A double clutch transmission according to the invention is configured such that it saves a large quantity of installation space, in particular on account of the coaxial arrangement of the two component transmissions. The actuation of the first component clutch which preferably lies radially on the inside and is surrounded coaxially by the second component clutch is possible through the flange section of the second driven shaft, which flange section extends in the radial direction. The configuration of the first actuating unit makes an actuation of the first component clutch through said flange section of the second driven shaft possible, although the second driven shaft has a different rotational speed during operation than the first driven shaft. The accessibility to a multiple disk assembly of the first component clutch is therefore advantageously increased. Here, the first actuating unit can be arranged on a side of the two component clutches, which side faces away from the input shaft. In this way, a flexible adaptation of the double clutch transmission to the installation space which is available in an electric vehicle is made possible. Furthermore, a double clutch transmission according to the invention can be manufactured comparatively inexpensively. Instead of multiple disk clutches, a double clutch transmission according to the invention can also comprise different component clutches, for example disk clutches. A drive unit according to the invention for an electric vehicle is also configured such that it saves a comparatively large amount of installation space, and can be manufactured inexpensively.

BRIEF DESCRIPTION OF THE DRAWINGS

Embodiments of the invention will be described in greater detail on the basis of the following description and the drawings, in which.

DETAILED DESCRIPTION

In the following description of the embodiments of the invention, identical or similar elements are denoted by way of identical designations, a repeated description of said elements being dispensed with in individual cases. The figures show the subject matter of the invention in a merely diagrammatic manner.

Figure 1:
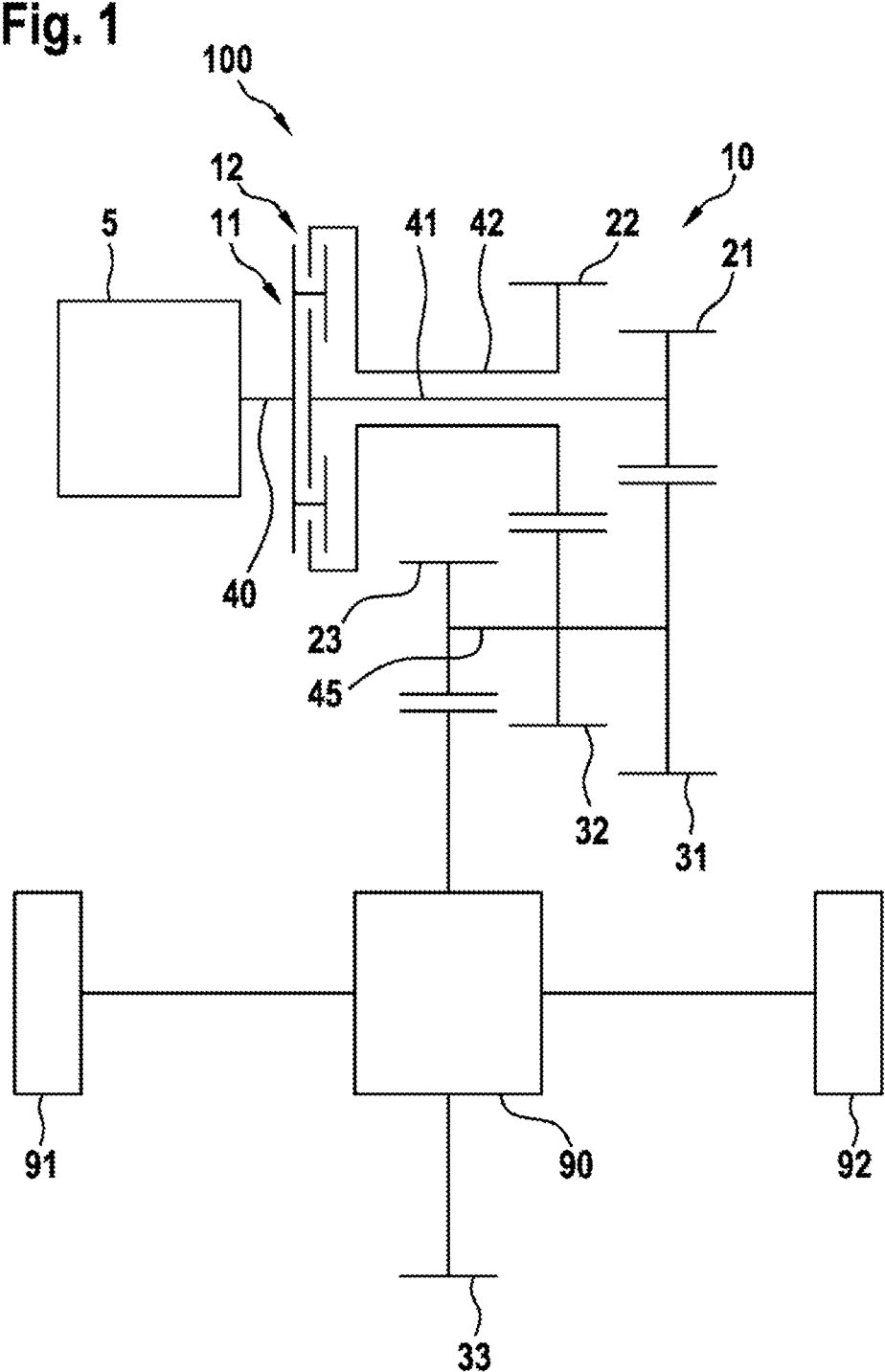
FIG. 1 shows a diagrammatic illustration of a drive unit for an electric vehicle.

FIG. 1 shows a diagrammatic illustration of a drive unit 100 for an electric vehicle. The drive unit 100 comprises a double clutch transmission 10 and an electric motor 5. The electric motor 5 drives an input shaft 40 of the double clutch transmission 10. Furthermore, the drive unit 100 according to the invention comprises a differential gear mechanism 90. Via in each case one axle drive, the differential gear mechanism 90 drives a first drive wheel 91 and a second drive wheel 92 of the electric vehicle.

As has already been mentioned, the double clutch transmission 10 comprises the input shaft 40 which is driven by the electric motor 5. Furthermore, the double clutch transmission 10 comprises a first driven shaft 41 and a second driven shaft 42. The double clutch transmission 10 also comprises a first component clutch 11 and a second component clutch 12. By means of the first component clutch 11, the input shaft 40 can be coupled to the first driven shaft 41. By means of the second component clutch 12, the input shaft 40 can be coupled to the second driven shaft 42.

The double clutch transmission 10 also comprises a first pinion 21 and a second pinion 22. The first driven shaft 41 is connected fixedly to the first pinion 21 for conjoint rotation. The second driven shaft 42 is connected fixedly to the second pinion 22 for conjoint rotation. Furthermore, the double clutch transmission 10 comprises a first gearwheel 31, a second gearwheel 32 and an output shaft 45. Here, the first gearwheel 31 and the second gearwheel 32 are connected fixedly to the common output shaft 45 for conjoint rotation.

The first pinion 21 meshes with the first gearwheel 31. The first pinion 21 and the first gearwheel 31 form a first gear stage. The second pinion 22 meshes with the second gearwheel 32. The second pinion 22 and the second gearwheel 32 form a second gear stage. Here, the first gear stage and the second gear stage have different transmission ratios. The double clutch transmission 10 therefore allows two different transmission ratios between the rotational speed of the input shaft 40 and the rotational speed of the output shaft 45.

The output shaft 45 of the double clutch transmission 10 is also connected fixedly to a third pinion 23 for conjoint rotation. The third pinion 23 meshes with a third gearwheel 33. The third gearwheel 33 serves to drive the differential gear mechanism 90 of the drive unit 100. The differential gear mechanism 90 can therefore be driven by the electric motor 5 via the double clutch transmission 10 with two different transmission ratios.

Figure 2:
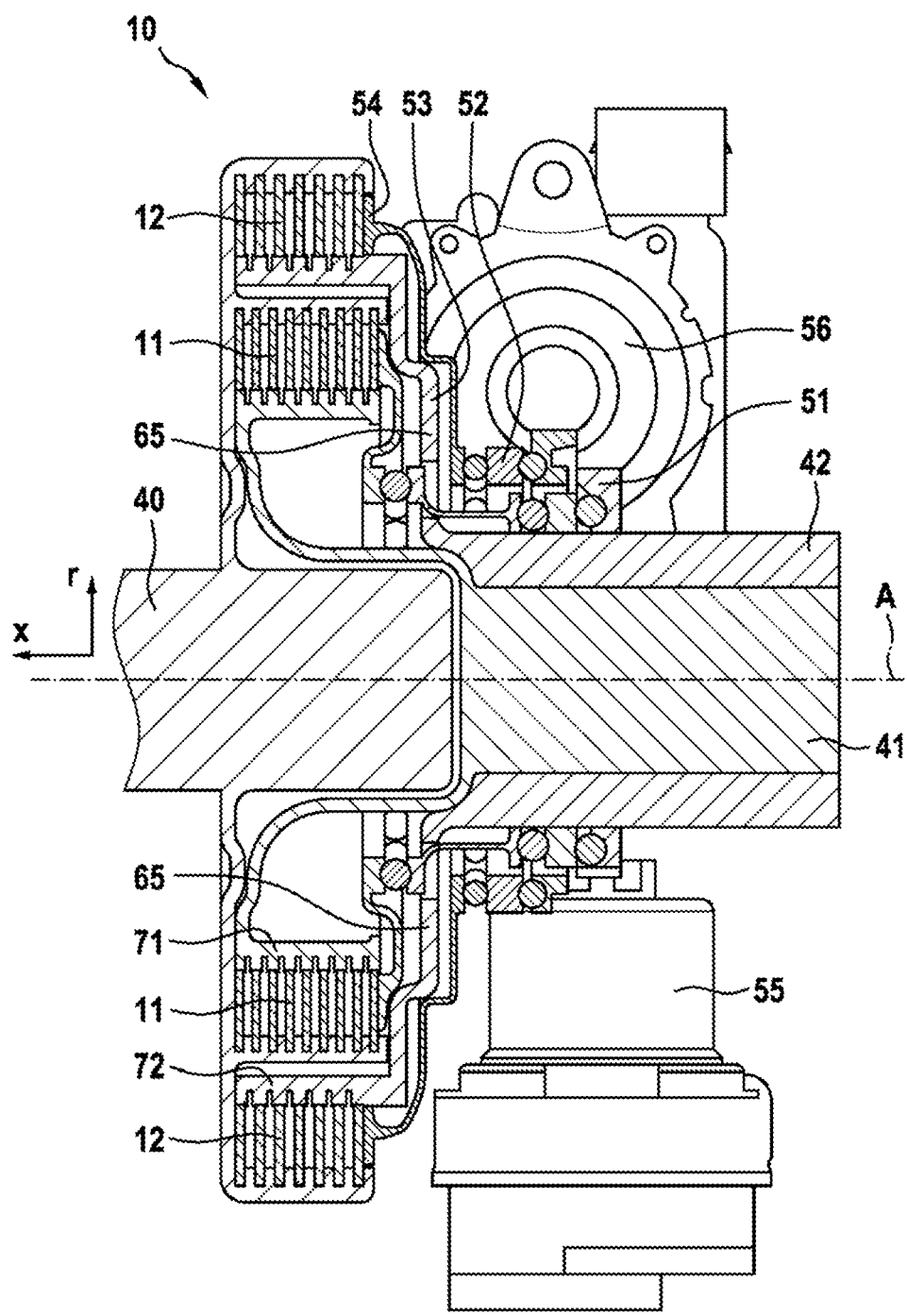
FIG. 2 shows a sectional illustration of a double clutch transmission of the drive unit from FIG. 1.

FIG. 2 shows a sectional illustration of a part of the double clutch transmission 10 of the drive unit 100 which is shown in FIG. 1. Here, the two pinions 21, 22, the two gearwheels 31, 32 and the output shaft 45 are not shown. The second driven shaft 42 is configured as a hollow shaft. The second driven shaft 42 coaxially surrounds the first driven shaft 41 which is configured as a solid shaft.

The first driven shaft 41 and the second driven shaft 42 therefore rotate about the same rotational axis A. In the present case, the input shaft 40 also rotates about the rotational axis A. A direction parallel to the rotational axis A is called an axial direction x in the following text. A direction at a right angle with respect to the rotational axis A is called a radial direction r in the following text.

The first component clutch 11 and the second component clutch 12 are configured in each case as a multiple disk clutch. The first component clutch 11 and the second component clutch 12 in each case have a multiple disk assembly which can be actuated by way of a pressing force which acts in the axial direction x. The second component clutch 12 surrounds the first component clutch 11 coaxially.

The first component clutch 11 has a first multiple disk carrier 71, on which disks of the associated multiple disk assembly are arranged. Multiple disks which correspond to the former of the associated multiple disk assembly are arranged on a corresponding carrier of the input shaft 40. In order to actuate the first component clutch 11, the double clutch transmission 10 comprises a first actuating unit 51.

The second component clutch 12 has a second multiple disk carrier 72, on which multiple disks of the associated multiple disk assembly are arranged. Multiple disks which correspond to the former of the associated multiple disk assembly are arranged on a corresponding carrier of the input shaft 40. In order to actuate the second component clutch 12, the double clutch transmission 10 comprises a second actuating unit 52.

Furthermore, the double clutch transmission 10 comprises a first switching unit 55 for driving the first actuating unit 51. In the present case, the first switching unit 55 has a geared motor to this end. The double clutch transmission 10 also comprises a second switching unit 56 for driving the second actuating unit 52. In the present case, the second switching unit 56 likewise has a geared motor to this end.

The second driven shaft 42 has a flange section 65 which extends in the radial direction r. The second multiple disk carrier 72 is attached to the multiple disk assembly in a radially outer region of the flange section 65. The second component clutch 12 is therefore attached in a radially outer region of the flange section 65.

The first actuating unit 51 has a first pressure plate 53 for actuating the first component clutch 11. If a pressing force acts in the axial direction x on the first pressure plate 53, the first pressure plate 53 presses the multiple disk assembly of the first component clutch 11 together, and the first component clutch 11 closes. As a result, the input shaft 40 is coupled to the first driven shaft 41.

The second actuating unit 52 has a second pressure plate 54 for actuating the second component clutch 12. If a pressing force acts in the axial direction x on the second pressure plate 54, the second pressure plate 54 presses the multiple disk assembly of the second component clutch 12 together, and the second component clutch 12 closes. As a result, the input shaft 40 is coupled to the second driven shaft 42.

Figure 3:
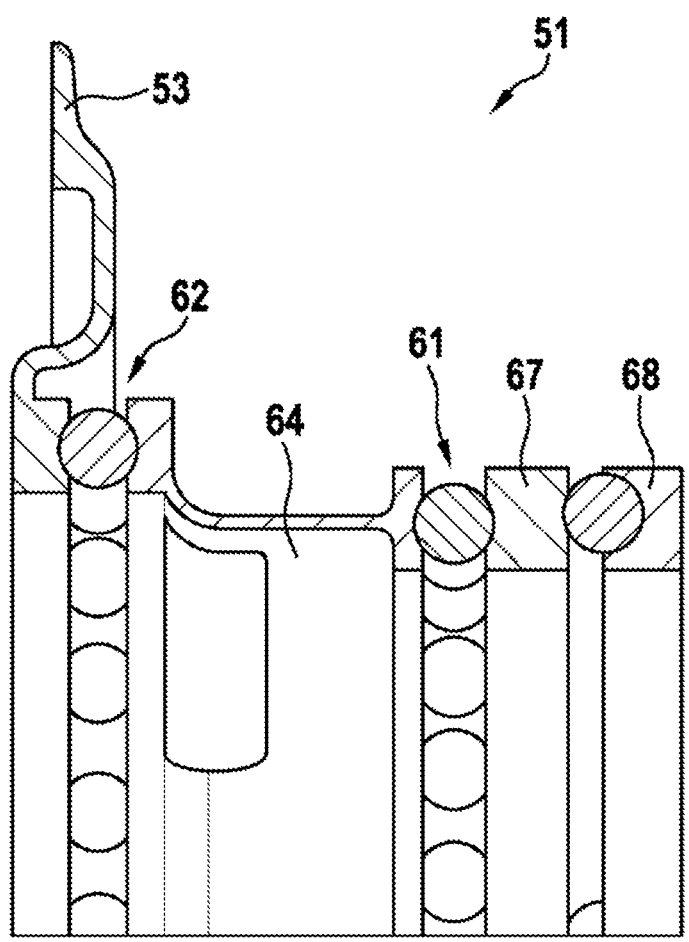
FIG. 3 shows a sectional illustration of a first actuating unit of the double clutch transmission from FIG. 2.

FIG. 3 shows a sectional illustration of the first actuating unit 51 for actuating the first component clutch 11 of the double clutch transmission 10 from FIG. 2. As has already been mentioned, the first actuating unit 51 can be driven by a first switching unit 55 which is not shown here.

The first actuating unit 51 has a driver 64. The driver 64 of the first actuating unit 51 reaches through the flange section 65 (not shown here) of the second driven shaft 42 in the axial direction x. Here, the driver 64 of the first actuating unit 51 is connected fixedly to the second driven shaft 42 for conjoint rotation. The driver 64 of the first actuating unit 51 can be displaced in the axial direction x relative to the flange section 65 of the second driven shaft 42, however.

Furthermore, the first actuating unit 51 has a first release bearing 61 and a second release bearing 62. Here, the driver 64 is arranged in the axial direction x between the first release bearing 61 and the second release bearing 62. The second release bearing 62 is arranged in the axial direction x between the driver 64 and the first pressure plate 53.

Furthermore, the first actuating unit 51 has a thrust ring 67 and a spreading disk 68. The first release bearing 61 is arranged in the axial direction x between the driver 64 and the thrust ring 67. The spreading disk 68 is arranged in the axial direction x on a side of the thrust ring 67, which side faces away from the first release bearing 61.

In the present case, the first release bearing 61 is configured as a ball bearing. The first release bearing 61 permits a transmission of a pressing force in the axial direction x from the thrust ring 67 to the driver 64. At the same time, the first release bearing 61 permits a rotation of the driver 64 relative to the thrust ring 67.

In the present case, the second release bearing 62 is configured as a ball bearing. The second release bearing 62 permits a transmission of a pressing force in the axial direction x from the driver 64 to the first pressure plate 53. At the same time, the second release bearing 62 permits a rotation of the first pressure plate 53 relative to the driver 64.

In order to close the first component clutch 11 of the double clutch transmission 10, the first switching unit 55 is actuated. The first switching unit 55 thereupon loads the spreading disk 68 of the first actuating unit 51 with a pressing force in the axial direction x. As a result, the spreading disk 68 is displaced in the axial direction x and transmits the pressing force to the thrust ring 67. As a result, the thrust ring 67 is displaced in the axial direction x and transmits the pressing force to the first release bearing 61.

As a result, the first release bearing 61 is displaced in the axial direction x and transmits the pressing force to the driver 64. As a result, the driver 64 is displaced in the axial direction x relative to the flange section 65 of the second driven shaft 42 and transmits the pressing force to the second release bearing 62. Here, the driver 64 rotates with the rotational speed of the second driven shaft 42. The pressing force is therefore transmitted in the axial direction x through the flange section 65 of the second driven shaft 42.

As a result, the second release bearing 62 is displaced in the axial direction x and transmits the pressing force to the first pressure plate 53. As a result, the first pressure plate 53 is displaced in the axial direction x and transmits the pressing force to the multiple disk assembly of the first component clutch 11. The first component clutch 11 closes thereupon. As a result, the input shaft 40 is coupled to the first driven shaft 41. Afterward, the first pressure plate 53 rotates with the rotational speed of the first driven shaft 41.

The invention is not restricted to the exemplary embodiments described herein and the aspects emphasized therein. Rather, a multiplicity of modifications which do not go beyond the abilities of a person skilled in the art are possible within the range specified by the claims.

What is claimed is:
1. A double clutch transmission (10) for an electric vehicle, the double clutch transmission comprising
   an input shaft (40),
   a first component clutch (11) configured to couple the input shaft (40) to a first driven shaft (41), and a second component clutch (12) configured to couple the input shaft (40) to a second driven shaft (42), the second driven shaft (42) being configured as a hollow shaft, wherein the second driven shaft (42) has a flange section (65) which extends in a radial direction (r), wherein the first component clutch (11) is configured to be actuated by a first actuating unit (51) which has a driver (64) which reaches through the flange section (65) in an axial direction (x) and is connected fixedly to the second driven shaft (42) for conjoint rotation, wherein the driver (64) is configured to be actuated in the axial direction (x) via a first release bearing (61), and wherein the first component clutch (11) is configured to be actuated in the axial direction (x) by the driver (64) via a second release bearing (62), wherein the second component clutch (12) surrounds the first component clutch (11) coaxially, wherein at least one of the first component clutch (11) and the second component clutch (12) is configured as a multiple disk clutch, wherein the first component clutch (11) includes a first multiple disk carrier (71), on which disks of an associated multiple disk assembly of the first component clutch (11) are arranged and which is connected to the first driven shaft (41), wherein disks of the associated multiple disk assembly of the first component clutch (11) are arranged on a corresponding carrier of the input shaft (40), wherein the disks of the first multiple disk carrier (71) extend radially outward relative to an axis (A) and the disks on the corresponding carrier of the input shaft (40) extend radially inward relative to the axis, and wherein a connection between the first driven shaft (41) and the first multiple disk carrier (71) is not penetrated by the driver (64).

2. The double clutch transmission (10) as claimed in claim 1, wherein the driver (64) is configured to be displaced in the axial direction (x) relative to the flange section (65).

3. The double clutch transmission (10) as claimed in claim 1, wherein the first actuating unit (51) has a first pressure plate (53) for the actuation of the first component clutch (11), which the first pressure plate (53) is configured to be actuated by the second release bearing (62).

4. The double clutch transmission (10) as claimed in claim 3, wherein the first pressure plate (53) is connected fixedly to the first driven shaft (41) for conjoint rotation.

5. The double clutch transmission (10) as claimed in claim 3, wherein the first pressure plate (53) is mounted so as to be rotated relative to the first driven shaft (41).

6. The double clutch transmission (10) as claimed in claim 1, wherein the first driven shaft (41) is connected fixedly for conjoint rotation to a first pinion (21) which meshes with a first gearwheel (31), and wherein the second driven shaft (42) is connected fixedly for conjoint rotation to a second pinion (22) which meshes with a second gearwheel (32).

7. The double clutch transmission (10) as claimed in claim 6, wherein the first gearwheel (31) and the second gearwheel (32) are connected fixedly for conjoint rotation to an output shaft (45) which is configured to be connected fixedly to a third pinion (23) for conjoint rotation.

8. A drive unit (100) for an electric vehicle, the drive unit comprising a double clutch transmission (10) as claimed in claim 1 and an electric motor (5) for driving the input shaft (40) of the double clutch transmission (10).

\* \* \* \* \*